(12) United States Patent
Jones et al.

(10) Patent No.: US 8,168,342 B2
(45) Date of Patent: May 1, 2012

(54) METHOD OF PRODUCING ($NH_2(R^2)$) AND/OR HYDROGEN

(75) Inventors: Martin Owen Jones, Oxford (GB); Simon R. Johnson, Oxford (GB); Peter P. Edwards, Oxford (GB); William I. f David, Oxford (GB)

(73) Assignee: The Science and Technology Facilities Council, Oxfordshire (GB)

( * ) Notice: Subject to any disclaimer, the term of this patent is extended or adjusted under 35 U.S.C. 154(b) by 590 days.

(21) Appl. No.: 12/373,246

(22) PCT Filed: Jul. 9, 2007

(86) PCT No.: PCT/GB2007/002558
§ 371 (c)(1),
(2), (4) Date: Jan. 9, 2009

(87) PCT Pub. No.: WO2008/007068
PCT Pub. Date: Jan. 17, 2008

(65) Prior Publication Data
US 2009/0197130 A1     Aug. 6, 2009

(30) Foreign Application Priority Data
Jul. 10, 2006 (GB) .................. 0613695.6

(51) Int. Cl.
*H01M 8/06* (2006.01)
*C01B 3/02* (2006.01)
*C01B 3/04* (2006.01)
*C01B 35/14* (2006.01)
*C01C 1/02* (2006.01)
*C01C 1/08* (2006.01)
*C07C 211/02* (2006.01)
*C07C 211/16* (2006.01)

(52) U.S. Cl. ........ 429/421; 423/284; 423/285; 423/352; 423/648.1; 564/1; 564/463

(58) Field of Classification Search ............... 423/658.2, 423/648.1, 352, 284, 285; 564/1, 463; 429/421
See application file for complete search history.

(56) References Cited

U.S. PATENT DOCUMENTS 3,035,891 A * 5/1962 Koster ......................... 423/286
3,108,431 A    10/1963 Armstrong et al.
(Continued)

FOREIGN PATENT DOCUMENTS

| EP | 1 531 301 A1 | 5/2005 |
| JP | 2005-154232 A | 6/2005 |
| WO | WO-98/14400 A1 | 4/1998 |
| WO | WO-00/07712 A1 | 2/2000 |
| WO | WO-2006/005892 A1 | 1/2006 |

OTHER PUBLICATIONS

Vajo et al. The Journal of Physical Chemistry B, 2005, vol. 109, No. 9, pp. 3719-3722, XP-002460246.

*Primary Examiner* — Wayne Langel
(74) *Attorney, Agent, or Firm* — Birch, Stewart, Kolasch & Birch, LLP

(57) ABSTRACT

A method of producing $NH_2(R^2)$, the method comprising reacting a metal hydride with a compound having the general formula: $M^1X(BH_4)y(NH_2(R^2))_n$ wherein $M^1$ comprises one or more of Li, Na, K, Rb, Cs, Be, Mg, Ca, Sr, Ba, La, Al, Ga and Sc; $0<n\leq4$; $R^2$ comprises —H, alkyl and an aromatic substituent; and x and y are selected so as to maintain electroneutrality.

15 Claims, 10 Drawing Sheets

U.S. PATENT DOCUMENTS

Figure 1:
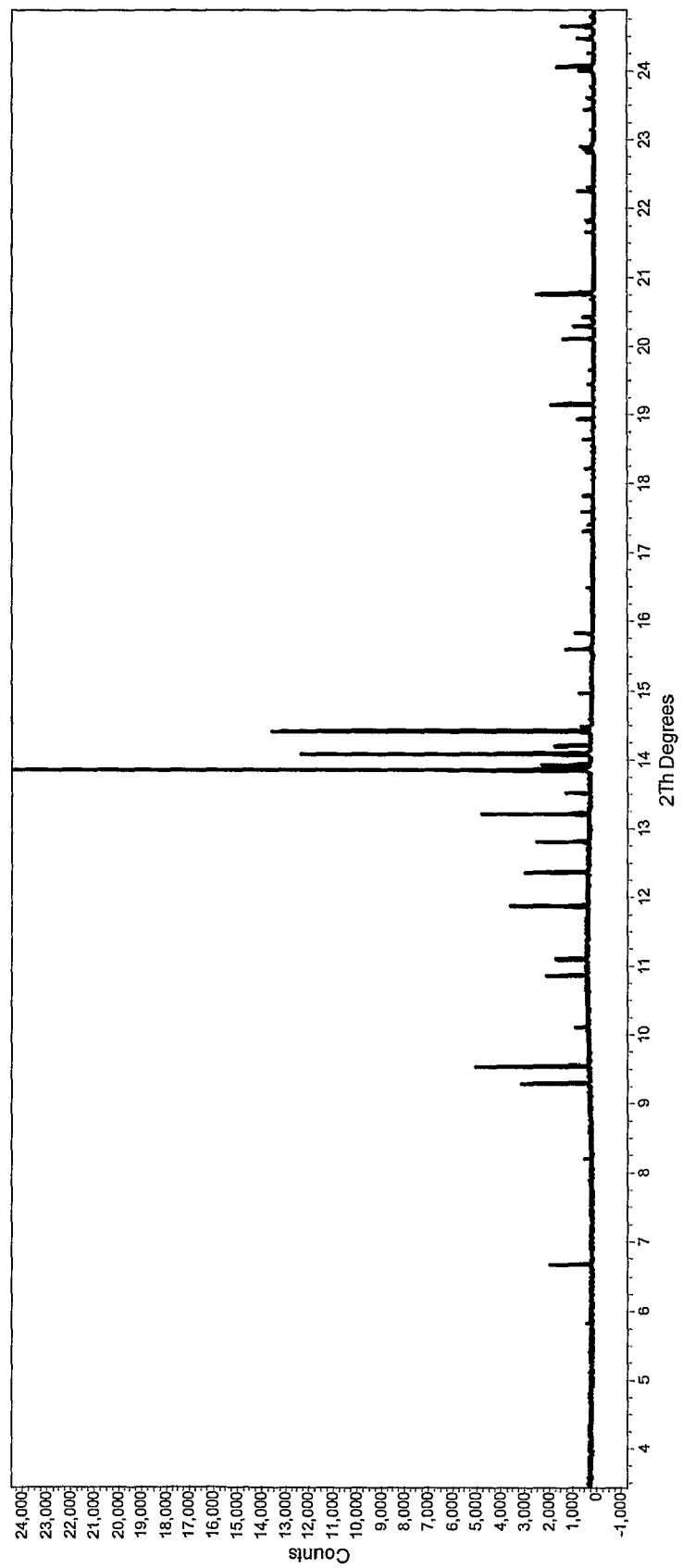

| | | | |
|---|---|---|---|
| 3,342,814 A * | 9/1967 | Hogsett et al. | 544/181 |
| 4,157,927 A | 6/1979 | Chew et al. | |
| 4,341,651 A * | 7/1982 | Beckert et al. | 252/188.25 |
| 4,604,271 A | 8/1986 | Wagner et al. | |
| 5,372,617 A | 12/1994 | Kerrebrock et al. | |
| 6,274,093 B1 | 8/2001 | Long et al. | |
| 7,214,439 B2 * | 5/2007 | Ortega et al. | 429/421 |
| 2004/0265226 A1 * | 12/2004 | Meisner et al. | 423/658.2 |
| 2005/0106097 A1 | 5/2005 | Graham et al. | |

\* cited by examiner

METHOD OF PRODUCING ($NH_2(R^2)$) AND/OR HYDROGEN

The present invention relates to a method of producing $NH_2(R^2)$ and/or hydrogen.

Hydrogen is widely regarded as a potentially useful fuel: it can be produced from a variety of renewable resources and, when used in fuel cells, offers the prospect of near-zero emission of pollutants and greenhouse gases. However, the development and exploitation of hydrogen as a major energy carrier requires solutions to many significant scientific and technological challenges.

Conventional hydrogen storage solutions include liquid hydrogen and compressed gas cylinders. However, a substantial energy input is necessary for either liquefying or compressing the hydrogen. There are also major safety concerns associated with these techniques (high pressure and liquid hydrogen boil-off).

Ammonia, for example, is known to be used as a hydrogen carrier, and, a number of its chemical and physical properties make it particularly suitable for such a purpose. For example, it possesses a high gravimetric density of hydrogen (17.6 wt %), and it is available in large quantities. However, there are a number of problems associated with the. storage of liquid ammonia as a chemical hydrogen store. For example, ammonia has a high coefficient of thermal expansion, a high vapour pressure at ambient conditions and a high propensity for reaction with water, and if released into the air, the vapour has a high toxicity.

The use of a solid state store for ammonia would alleviate a number of these concerns, specifically those of thermal expansion, vapour pressure and reactivity.

WO 2006/012903 discloses a solid ammonia storage material. Although this document is not directed towards hydrogen Btorage, it describes a reaction between $MgCl_2$ and ammonia at room temperature to form the hexamine $MgCl_2 (NH_3)_6$. The ammonia may be absorbed and desorbed reversibly. Desorption begins at 150° C., with full ammonia desorption occurring at 400° C. The gravimetric, ammonia density of $MgCl_2 (NH_3)_6$ is 51.7% and its hydrogen density is 9.1 wt %.

It has been surprisingly discovered that compounds having the general formula:

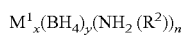

wherein $M^1$ comprises one or more of Li, Na, K, Rb, Cs, Be, Mg, Ca, Sr, Ba, La, Al, Ga and Sc;

$0 < n \leq 4$;

$R^2$ comprises —H, alkyl and an aromatic substituent; and x and y are selected so as to maintain electroneutrality, and, in particular, $LiBH_4(NH_3)_n$ wherein $0 < n \leq 4$, may be used to provide an improved method of storing and producing ammonia and/or hydrogen.

Accordingly, the present invention provides a method of producing $NH_2(R^2)$ and/or hydrogen, the method comprising reacting a metal hydride with a compound having the general formula:

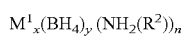

wherein $M^1$ comprises one or more of Li, Na, K, Rb, Cs, Be, Mg, Ca, Sr, Ba, La, Al, Ga and Sc;

$0 < n \leq 4$;

$R^2$ comprises —H, alkyl and an aromatic substituent; and x and y are selected so as to maintain electroneutrality.

In another aspect of the present invention there is provided a method of producing $NH_2(R^2)$, the method comprising heating at a temperature of from −20 to 150° C. a compound having the general formula:

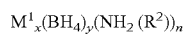

wherein $M^1$ comprises one or more of Li, Na, K, Rb, Cs, Be, Mg, Ca, Sr, Ba, La, Al, Ga and Sc, $0 < n \leq 4$;

$R^2$ comprises —H, alkyl and an aromatic substituent; and x and y are selected so as to maintain electroneutrality.

When $M^1$ comprises Li, the method preferably comprises heating at a temperature of from 20 to 60° C.

When $M^1$ comprises one or more of Na, K, Rb, Cs, the method preferably comprises heating at a temperature of from −20 to 60° C.

When $M^1$ comprises one or more of Be, Mg, Ca, Sr, Ba, La, Al, Ga and Sc, the method preferably comprises heating at a temperature of from 40 to 150 ° C.

The temperature of desorption of $NH_2R^2$ or hydrogen may also be increased by encapsulating the host material in zeolite and other mesoporous materials.

Each aspect as defined herein may be combined with any other aspect or aspects unless clearly indicated to the contrary. In particular any feature indicated as being preferred or advantageous may be combined with any other feature or features indicated as being preferred or advantageous.

The metal hydride used in the present invention comprises one or more hydrides of an alkali metal (Li, Na, K, Rb, Cs), an alkaline earth metal (Be, Mg, Ca, Sr, Ba), a first row transition metal (Sc, Ti, V, Cr, Mn, Fe, Co, Ni, Cu, Zn), a second row transition metal (Y, Zr, Nb, Mo, Tc, Ru, Rh, Pd, Ag, Cd), and a third row transition metal (La, Hf, Ta, W, Re, Os, Ir, Pt, Au, Hg). Preferably, the metal hydride comprises one or more, of LiH, NaH, KH, RbH, CsH, $BeH_2$, $MgH_2$, $CaH_2$, $SrH_2$ and $BaH_2$. More preferably, the metal hydride comprises LiH. It will be understood that the choice of metal hydride used in the present invention may affect the temperature at which the $NH_2R^2$ or hydrogen is released.

Preferably the ratio of $M^1_x(BH_4)_y(NH_2(R^2))_n$ to metal hydride is between 1:0.01 and 1:10, more preferably between 1:0.05 and 1:5.

The compound having the general formula:

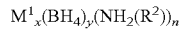

wherein $M^1$ comprises one or more of Li, Na, K, Rb, Cs, Be, Mg, Ca, Sr, Ba, La, Al, Ga and Sc;

$0 < n \leq 4$;

$R^2$ comprises —H, alkyl and an aromatic substituent; and x and y are selected so as to maintain electroneutrality, as described herein, may be considered as a hydrogen storage, and or ammonia (wherein $R^2$=—H) storage compound or composition.

The present inventors have found that such compounds have particularly advantageous properties which enable them to act as useful ammonia and hydrogen storage materials. These compounds have high gravimetric $NH_2(R^2)$ and hydrogen storage densities. $NH_2(R^2)$ and/or hydrogen may be released under suitably low temperature and pressure conditions for use, for example, in fuel cells. Furthermore, they possess rapid absorption and desorption kinetics, and the absorption and desorption of $NH_2(R^2)$ is reversible.

Further advantages of such compounds for use as storage materials include that the compounds may be made cheaply, from readily-available materials using low-energy preparation methods. They are typically resistant to poisoning by trace impurities and generally have good thermal conductivity in charged and uncharged conditions.

The compound of the present invention having the general formula: $M^1_x(BH_4)_y(NH_2(R^2))_n$ is preferably in the solid form.

$M^1$ as described herein comprises one or more of Li, Na, K, Rb, Cs, Be, Mg, Ca, Sr, Ba, La, Al, Ga and Sc. In one embodiment of the present invention $M^1$ is Li, Na, K, Rb, Cs, Be, Mg, Ca, Sr, Ba, La, Al, Ga or Sc. More preferably $M^1$ is Li or Na. Most preferably $M^1$ is Li.

In another embodiment $M^1$ comprises at least 70% molar proportion of Li and the balance is one of more of Na, K, Rb, Cs, Be, Mg, Ca, Sr, Ba, La, Al, Ga and Sc. For example, $M^1$ may comprise $(Li_{0.7}Na_{0.3})^+$. Preferably $M^1$ comprises at least 80% molar proportion of Li and the balance is one of more of Na, K, Rb, Cs, Be, Mg, Ca, Sr, Ba, La, Al, Ga and Sc. More preferably, $M^1$ comprises at least 90% molar proportion of Li and the balance is one of more of Na, K, Rb, Cs, Be, Mg, Ca, Sr, Ba, La, Al, Ga and Sc. Most preferably, $M^1$ comprises at least 95% molar proportion of Li and the balance is one of more of Na, K, Rb, Cs, Be, Mg, Ca, Sr, Ba, La, Al, Ga and Sc.

In one embodiment of the present invention wherein $M^1$ comprises Li, the Li may be doped with up to 10% (by total weight of Li) of one or more of $Na^+$, $K^+$, $Rb^+$, $Cs^+$. In another embodiment wherein $M^1$ comprises Li, the Li may be doped with up to 20% (by total, weight of Li) of one or more of $Be^{2+}$, $Mg^{2+}$, $Ca^{2+}$, $Sr^{2+}$, $Ba^{2+}$, $La^{3+}$, $Al^{3+}$, $Ga^{3+}$, $Sc^{3+}$.

The present inventors have found that the temperature absorption and desorption of $NH_2(R^2)$ and of hydrogen, may be modified by the choice of $M^1$.

$R^2$ comprises one or more of —H, alkyl and an aromatic substituent. More preferably, $R^2$ comprises —H. Preferably the alkyl is a straight of branched alkyl having one to ten, or greater carbons. Preferably, when $R^2$ is an aromatic substituent it has six or more carbons.

The present inventors have found that the temperature absorption and desorption of $NH_2(R^2)$ and of hydrogen, may also be modified by the choice of $NH_2(R^2)$.

In one embodiment of the present invention $M^1$ is Li, $0<n\leq4$ and $R^2$ comprises —H, such that the metal hydride is reacted with $LiBH_4(NH_3)_n$, wherein $0<n\leq4$. The present inventors have found that $LiBH_4(NH_3)_n$, wherein $0<n\leq4$ is a highly efficient ambient temperature (at below approximately 40 to 60° C.) ammonia store, and a high gravimetric density, high temperature (at approximately 200 to 300° C.) hydrogen store material.

Compounds having the general formula: $M^1_x(BH_4)_y(NH_2(R^2))_n$ may be synthesised via a number of routes.

For example, excess gaseous ammonia may be flowed over dry $M^1_x(BH_4)_y$ in an inert (argon gas) environment at room temperature.

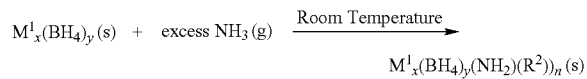

Alternatively, dry $M^1_x(BH_4)_y$ may be treated with dried liquid ammonia at −68° C. in an inert (argon gas) environment.

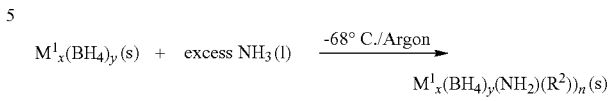

Preferably, the method of producing $NH_2(R^2)$ in the presence of a metal hydride as described herein is carried out in the temperature range of from 0 to 400 20 C. More preferably, it is carried out in the temperature range of from 0 to 100° C., from 100 to 150° C., from 150 to 200° C., or from 200 to 400° C. Most preferably it is carried out in the temperature range of from 0 to 50° C. It will, however, be understood that the temperature used in the method of the present invention to produce $NH_2(R^2)$ will vary depending on the specific composition of the starting compound and the metal hydride(s) used.

In the presence of a metal hydride the temperatures required for ammonia release are typically lower than those required in the absence of a metal hydride.

The method of the present invention for producing $NH_2(R^2)$ has the advantage that the $NH_2(R^2)$ may be produced at low temperatures. Whereas prior art methods typically require temperatures greater than 150° C., $NH_2(R^2)$ may be released from $M^1_x(BH_4)_y(NH_2(R^2))_n$ at temperatures as low as −20° C.

Preferably, the method of producing hydrogen by directly mixing $M^1_x(BH_4)_y(NH_2(R^2))_n$ with a metal hydride as described herein is carried out in the temperature of from 0 to 400° C. More preferably, it is carried put in the temperature range of from 0 to 100° C., from 100 to 200° C., from 200 to 300° C., or from 300 to 400° C. Most preferably it is carried out in the temperature range from 0 to 100° C. It will, however, be understood that the temperature used in the method of the present invention to produce hydrogen will vary depending on the specific composition of the starting compound and which metal hydride(s) is used.

When the compound of the present invention is $LiBH_4(NH_3)_n$, an enhanced release of hydrogen may he observed when $LiBH_4(NH_3)_n$ is heated from between 275 and 350° C. Without wishing to be bound by any particular theory, it is thought that the additional hydrogen release is a result of the decomposition of $Li_4BN_3H_{10}$, which is produced when $LiBH_4(NH_3)_n$ ($0<n\leq4$) is heated.

Decomposition of $LiBN_3H_{10}$ may be as follows:

$$Li_4BN_3H_{10} \rightleftharpoons Li_3BN_2 + 0.5Li_2NH + 0.5NH_3 + 4H_2$$

Alternatively, the following reaction may occur:

$$Li_4BN_3H_{10} + 0.5LiBH_4 \rightleftharpoons 1.5Li_3BN_2 + 6H_2$$

Both of these reactions are believed to occur between 275 and 350° C. and result in the release of hydrogen.

Compounds having the general formula: $M^1_x(BH_4)_y(NH_2(R^2))_n$ as described herein preferably may be stored in a stable form at between −20 and 200° C. depending on the composition.

In one embodiment of the present invention a metal hydride (for example; LiH, NaH, $MgH_2$) is reacted in the same vessel as $M^1_x(BH_4)_{y\,1\,(NH2}(R^2))_n$ (for example, $LiBH_4(NH_3)_n$) to produce hydrogen. Preferably the molar ratio of $M^1_x(BH_4)_y(NH_2(R^2))_n$ to metal hydride is from 1:3 to 1:n, more preferably from 1:3 to 1:2n, most preferably from 1:3 to 1:(2n−3), wherein $0\leq n\leq 4$.

Without wishing to be bound by any particular theory, it is thought that the following reactions occur when LiBH$_4$(NH$_3$)$_n$ is reacted with LiH:

a)

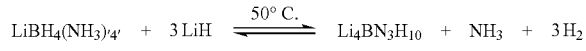

b)

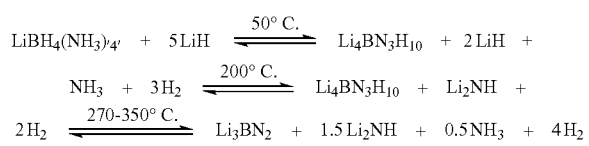

It will be understood that the temperature of reaction may be controlled though chemical substitution of some of the Li in LiBH$_4$(NH$_3$)$_n$, wherein 0<n≦4, with a metal comprising one or more of Na, K, Rb, Cs, Be, Mg, Ca, Sr, Ba, La, Al, Ga and Sc. For example, including some Mg in the LiBH$_4$(NH$_3$)$_n$ increases the temperature at which NH$_3$ is removed from the compound.

In another embodiment of the present invention, hydrogen may be produced by a two-step process. NH$_2$(R$^2$) may be produced by heating from 20 to 60° C. a compound having the general formula:

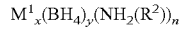

wherein M$^1$ comprises one or more of Na, K, Li, Rb, Cs, Be, Mg, Ca, Al, Ga and Sc;
0<n≦4;
R$^2$ comprises —H, alkyl and an aromatic substituent; and
x and y are selected so as to maintain electroneutrality. The NH$_2$(R$^2$) produced may then be reacted with a metal hydride to produce hydrogen.

In this embodiment the molar ratio of NH$_2$(R$^2$) to metal hydride is preferably 1:1.

Without wishing to be bound by any particular theory, it is thought that the following reactions occur when LiBH$_4$(NH$_3$)$_n$ is firstly heated to remove NH$_3$, and then the NH$_3$ produced is reacted in a separate vessel with LiH:

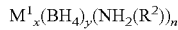

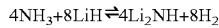

Preferably, in the two-step method of producing hydrogen as described herein, the first step is carried out in the temperature range from −20 to 200° C. and the second step is carried out in the temperature range of from 50 to 300° C.

More preferably, the first step is carried out in the temperature range of from −20 to 100° C., from 20 to 80° C., from 20 to 60° C. or from 40 to 60° C.

More preferably, the second step is carried out in the temperature range of from 50 to 250° C., from 50 to 200° C., from 50 to 150° C. or from 100 to 150° C.

It will, however, be understood that the temperature used in the method of the present invention to produce hydrogen will vary depending on the specific composition of the starting compound and which metal hydride(s) is used.

The methods of the present invention may be carried out in a fuel cell. In particular, the use of the compound described herein as a hydrogen storage material has many advantages over known hydrogen storage materials. For example, it may be transported safely and conveniently in the solid form between, for example, −20 and 200° C. (depending on the specific composition) under an inert atmosphere. Further-more, when M$^1$(BH$_4$) (NH$_2$R$^2$)$_n$ is heated to produce (NH$_2$R$^2$)$_n$ in the absence of a metal hydride, M$^1$(BH$_4$) may be recovered, and reacted with (NH$_2$R$^2$)$_n$ to regenerate M$^1$(BH$_4$)(NH$_2$R$^2$)$_n$.

In another aspect of the present invention there is provided an apparatus for producing hydrogen, said apparatus comprising:
storage means containing a metal hydride;
housing means containing a compound of the general formula:

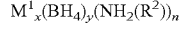

wherein M$^1$ comprises one or more of Li, Na, K, Rb, Cs, Be, Mg, Ca, Sr, Ba, La, Al, Ga and Sc;
0<n≦4;
R$^2$ comprises —H, alkyl and an aromatic substituent; and
x and y are selected so as to maintain electroneutrality; and
means for contacting the metal hydride with the compound of the general formula M$^1_x$(BH$_4$)$_y$(NH$_2$(R$^2$))$_n$.

In one embodiment, the apparatus may further comprise a reaction vessel and means for transferring the metal hydride from the storage means to the reaction vessel, and means for transferring the compound from the housing means to the reaction vessel.

In another embodiment, the apparatus may further comprise means for transferring said metal hydride from the storage means into the housing means.

In another embodiment, the apparatus may further comprise means for transferring said compound of the general formula M$^1_x$(BH$_4$)$_y$(NH$_2$(R$^2$))$_n$ from the housing means to the storage means.

The apparatus may further comprise a fuel cell and means for transferring any hydrogen produced to the fuel cell.

In another aspect of the present invention there is provided an apparatus for producing hydrogen, said apparatus comprising:
storage means containing a metal hydride;
housing means containing a compound of the general formula:

M$^1_x$(BH$_4$)$_y$(NH$_2$(R$^2$))$_n$ wherein M$^{1'}$ comprises one or more of Li, Na, K, Rb, Cs, Be, Mg, Ca, Sr, Ba, La, Al, Ga and Sc;
0<n≦4;
R$^2$ comprises —H, alkyl and an aromatic substituent; and
x and y are selected so as to maintain electroneutrality; and
means for heating said compound to produce NH$_2$(R$^2$); and
means for contacting the NH$_2$(R$^2$) produced with the metal hydride.

In one embodiment, the apparatus may further comprise a first reaction vessel and means for transferring said compound of the general formula M$^1_x$(BH$_4$)$_y$(NH$_2$(R$^2$))$_n$ from the housing means to the first reaction vessel. The compound may be heated in said reaction vessel to produce NH$_2$(R$^2$).

The apparatus may further comprise a means for transferring the metal hydride to the first reaction vessel. The NH$_2$(R$^2$) produced may then be reacted in situ in the reaction vessel with the metal hydride to produce hydrogen.

Alternatively, the apparatus may further comprise a second reaction vessel, means for transferring said NH$_2$(R$^2$) produced in the first reaction vessel to the second reaction vessel and a means for transferring the metal hydride from the storage means to the second reaction vessel.

The apparatus may further comprises a fuel cell and means for transferring any hydrogen produced to the fuel cell.

In further aspect of the present invention there is provided an adiabatic heat pump comprising a housing means for a compound having the general formula:

$$M^1_x(BH_4)_y(NH_2(R^2))_n$$

wherein $M^1$ comprises one or more of Li, Na, K, Rb, Cs, Be, Mg, Ca, Sr, Ba, La, Al, Ga and Sc;
$0<n\leq 4$;
$R^2$ comprises —H, alkyl and an aromatic substituent; and
x and y are selected so as to maintain electroneutrality;
means for heating said compound to produce $NH_2(R^2)$;
means for transferring energy from said $NH_2(R^2)$ and means for recycling said produced $NH_2(R^2)$ to reform said starting compound.

The present invention will now be described further, by way of example only, with reference to the following examples and drawings, in which:

FIG. 1: Synchrotron X-ray diffraction data for the larger $LiBH_4(NH_3)_n$ phase of the nominal composition $LiBH_4(NH_3)_4$.

Figure 2:
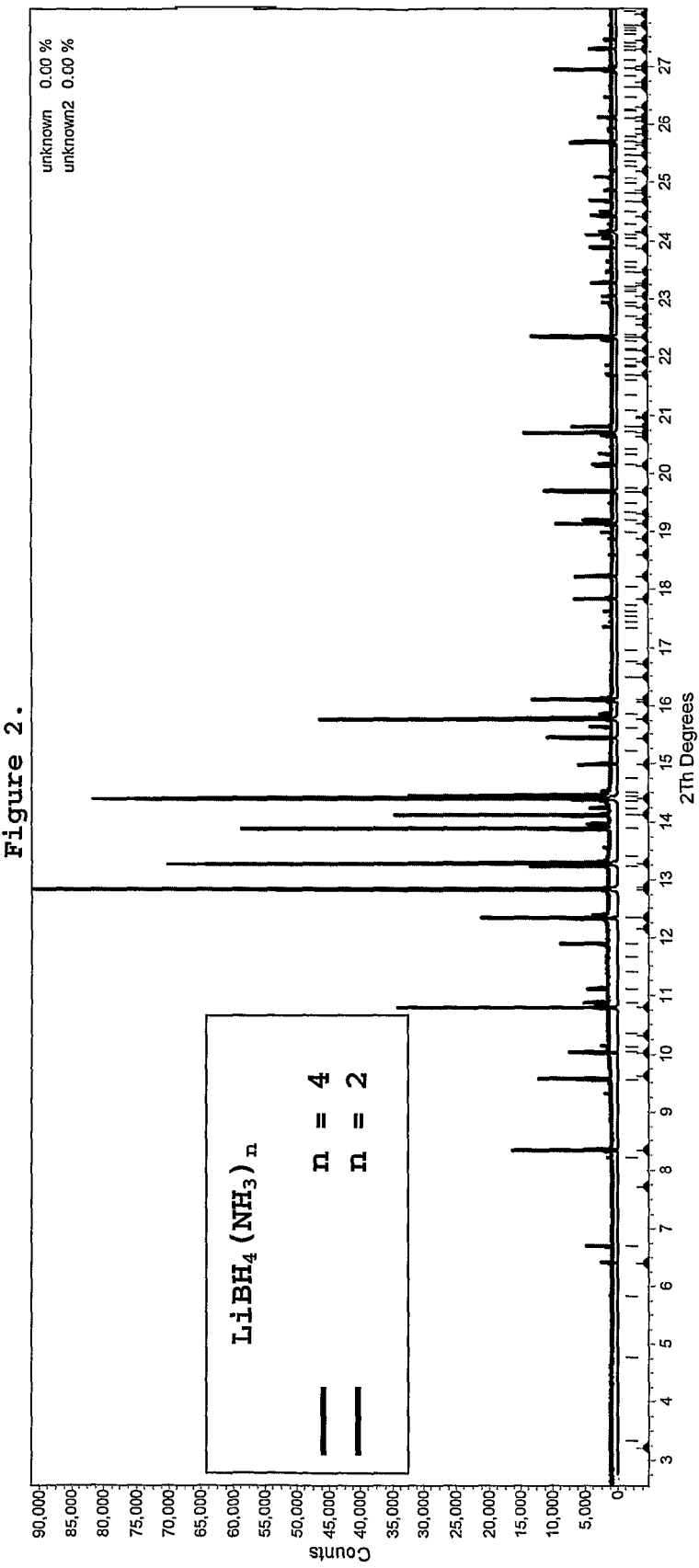

FIG. 2: Synchrotron X-ray diffraction data for both $LiBH_4(NH_3)_n$ phases, nominal compositions $LiBH_4(NH_3)_4$, and $LiBH_4(NH_3)_4$.

Figure 3A:
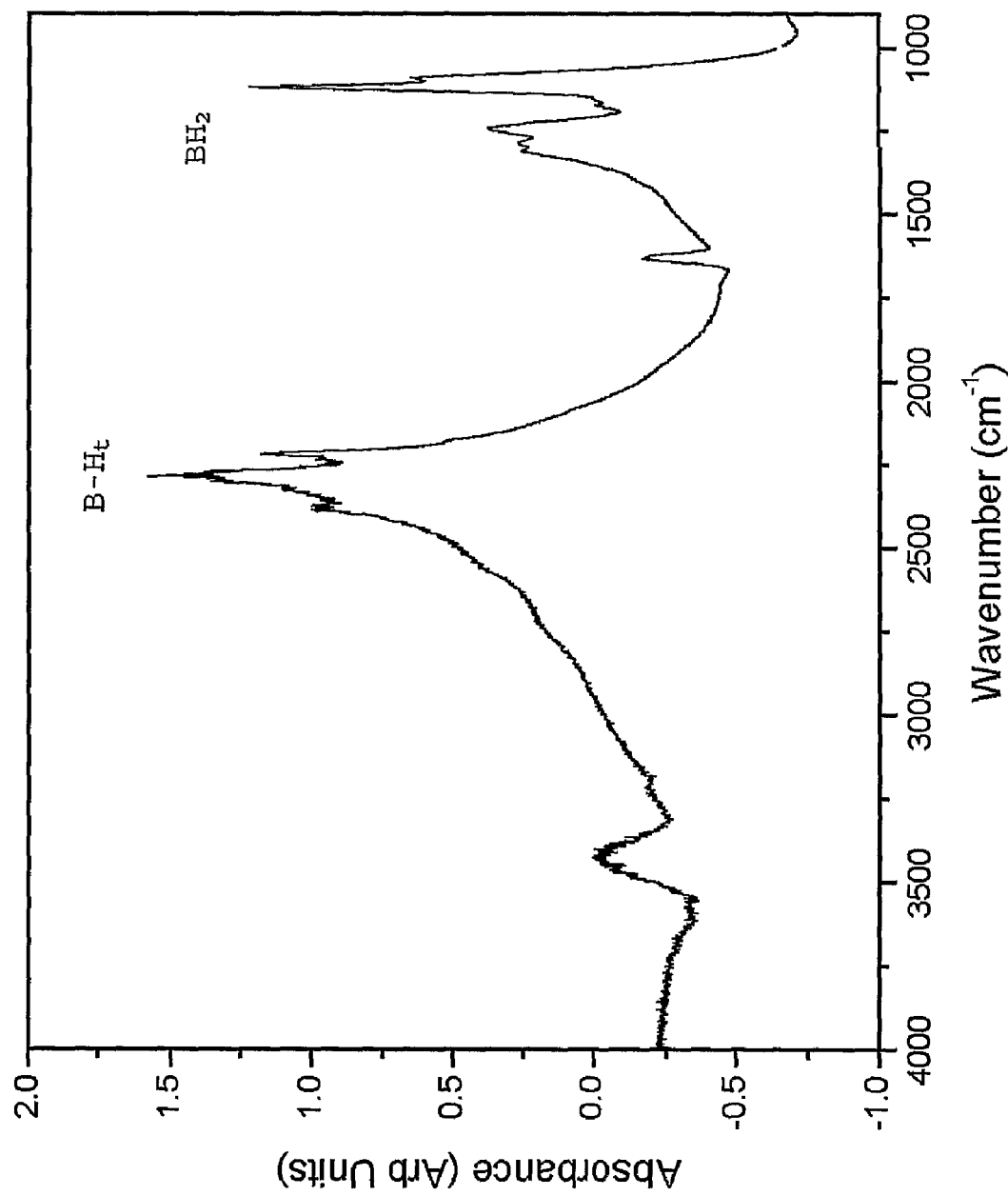

FIG. 3a: FTIR spectrum of $LiBH_4$.

Figure 3B:
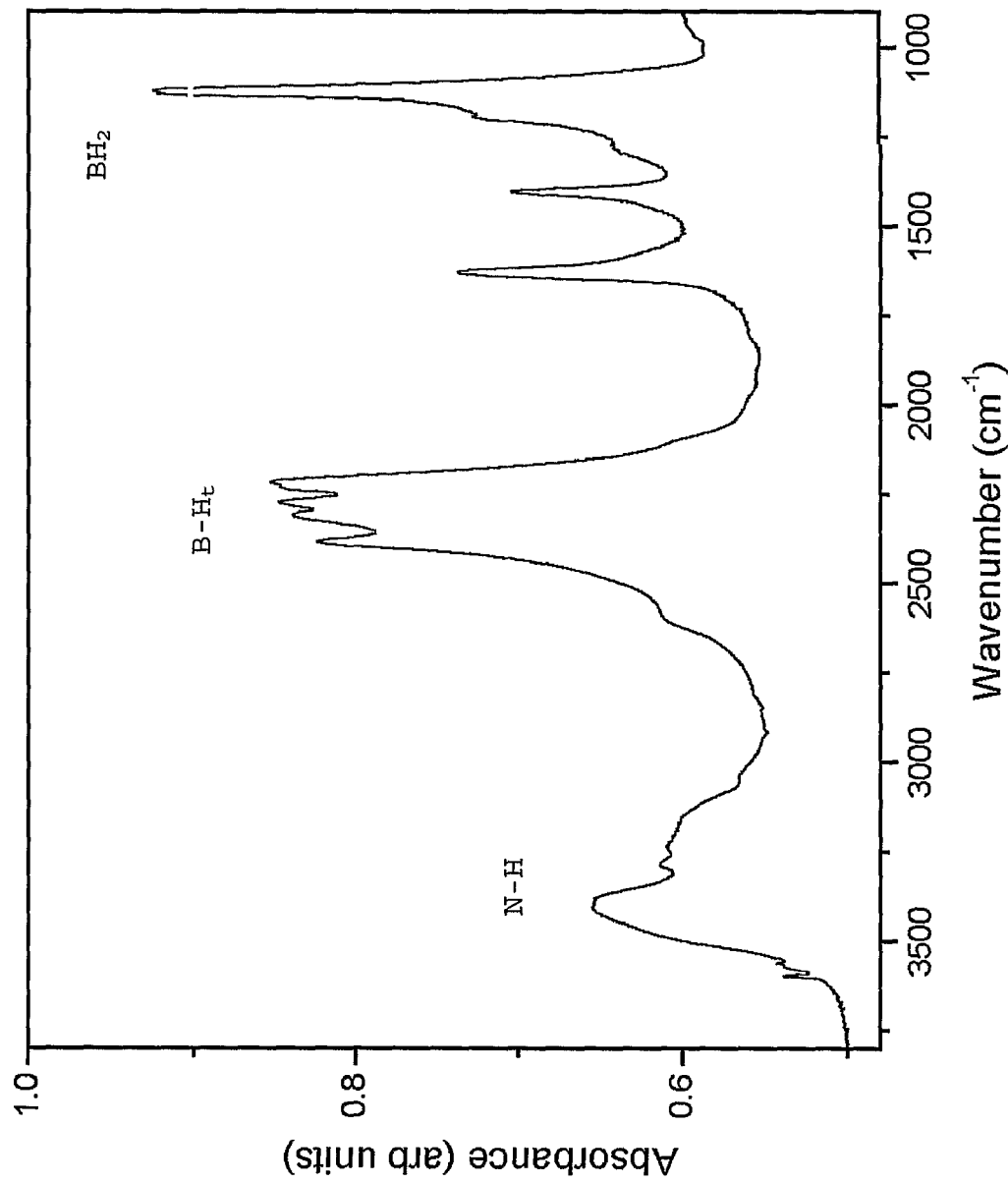

FIG. 3b: FTIR spectrum of $LiBH_4(NB_3)_n$ phase of the nominal composition $LiBH_4(NH_3)_4$.

Figure 4:
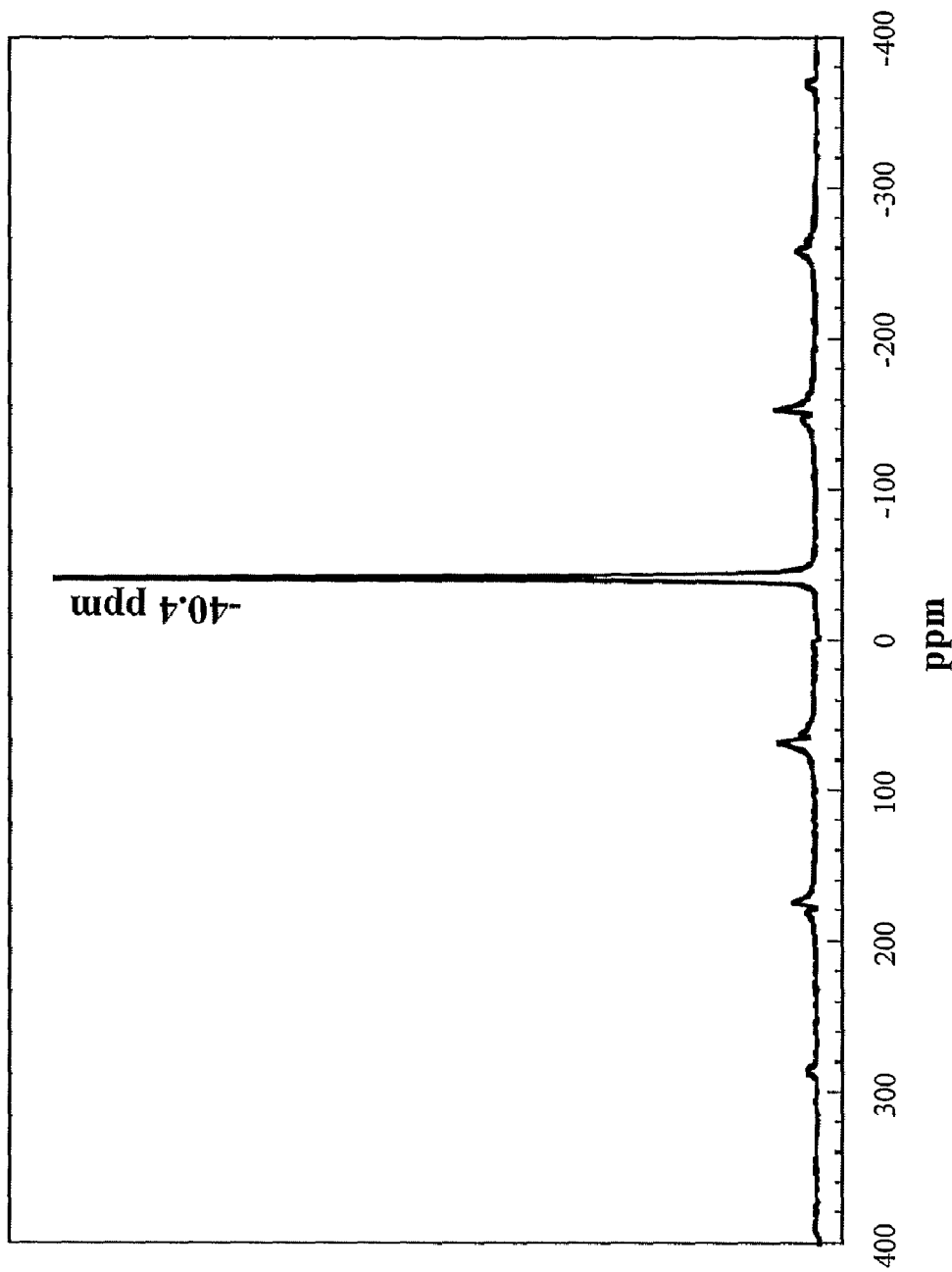

FIG. 4: Solid state NMR spectrum for $LiBH_4(NH_3)_n$ phase of the nominal composition $LiBH_4(NH_3)_4$.

Figure 5:
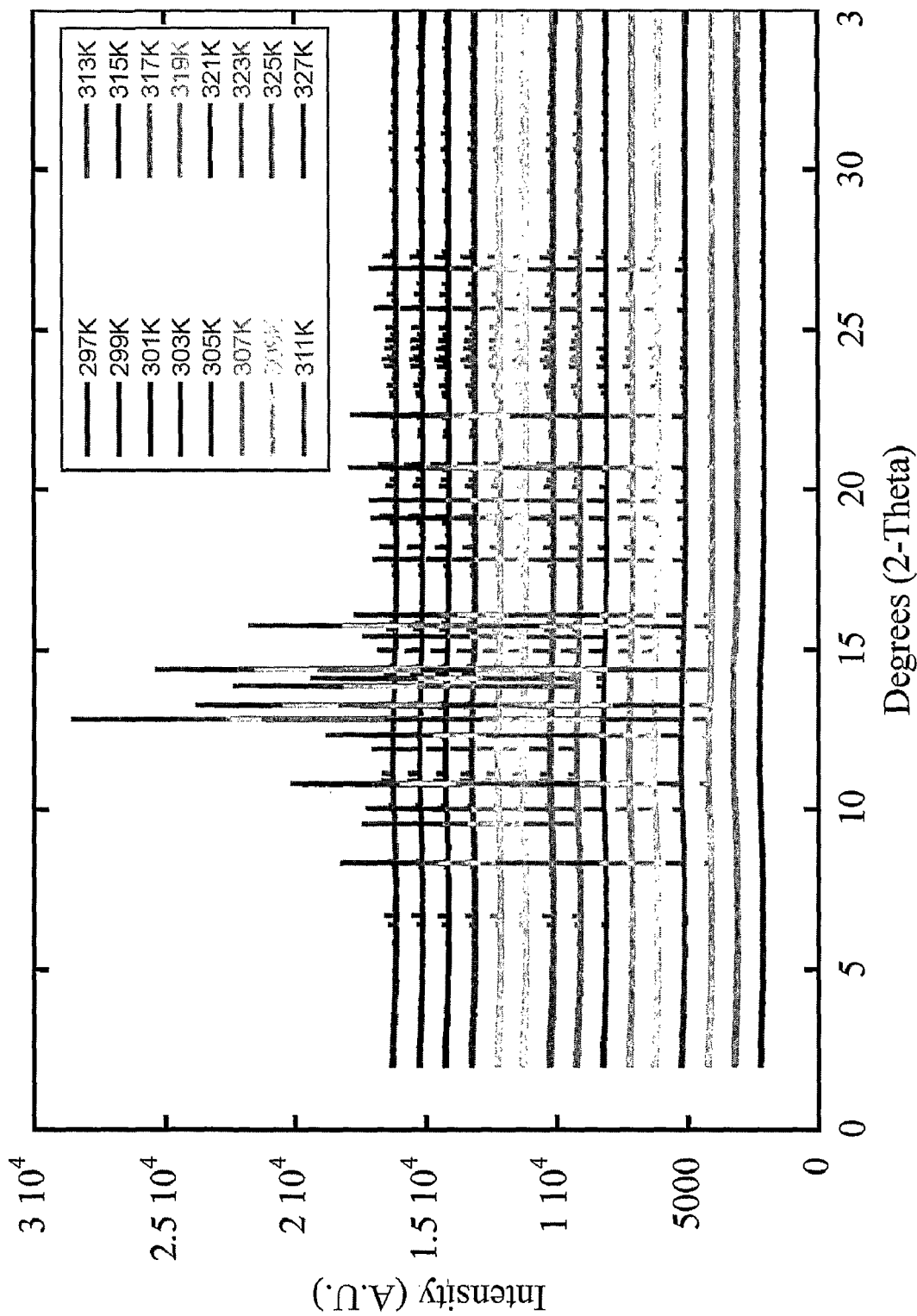

FIG. 5: Temperature resolved synchrotron X-ray diffraction data for $LiBH_4(NH_3)_n$ phases (n=2 and 4).

Figure 6:
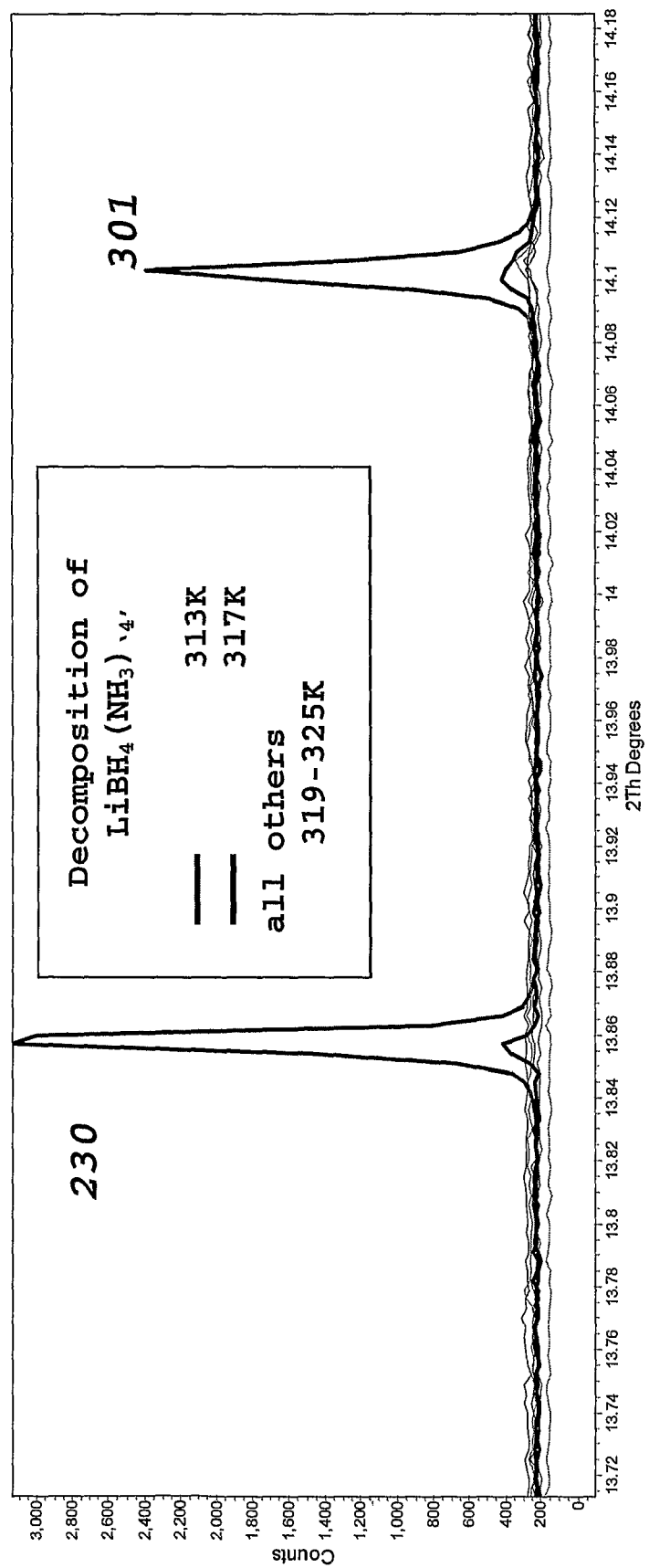

FIG. 6: Temperature resolved synchrotron X-ray diffraction data for the 230 and 301 diffraction peaks of $LiBH_4(NH_3)_n$ phase of the nominal composition $LiBH_4(NH_3)_4$.

Figure 7:
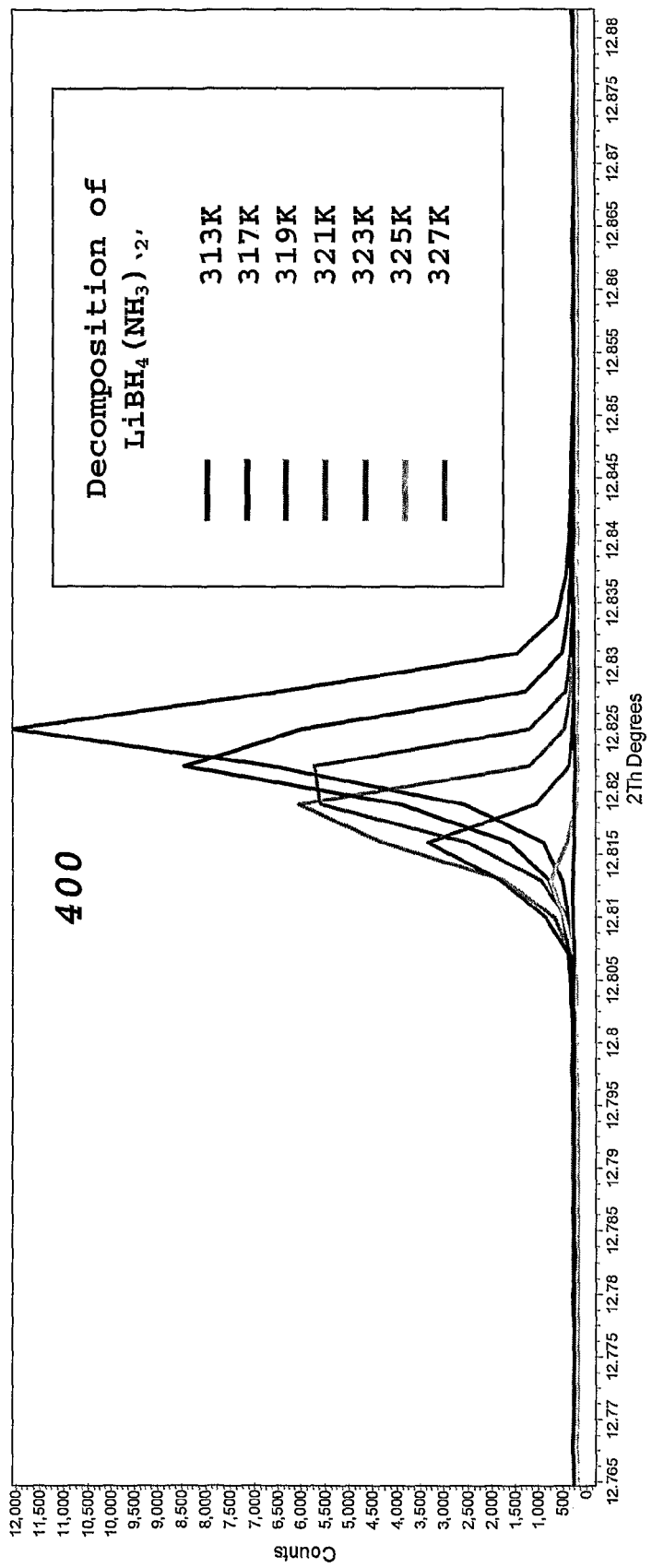
Figure 8:
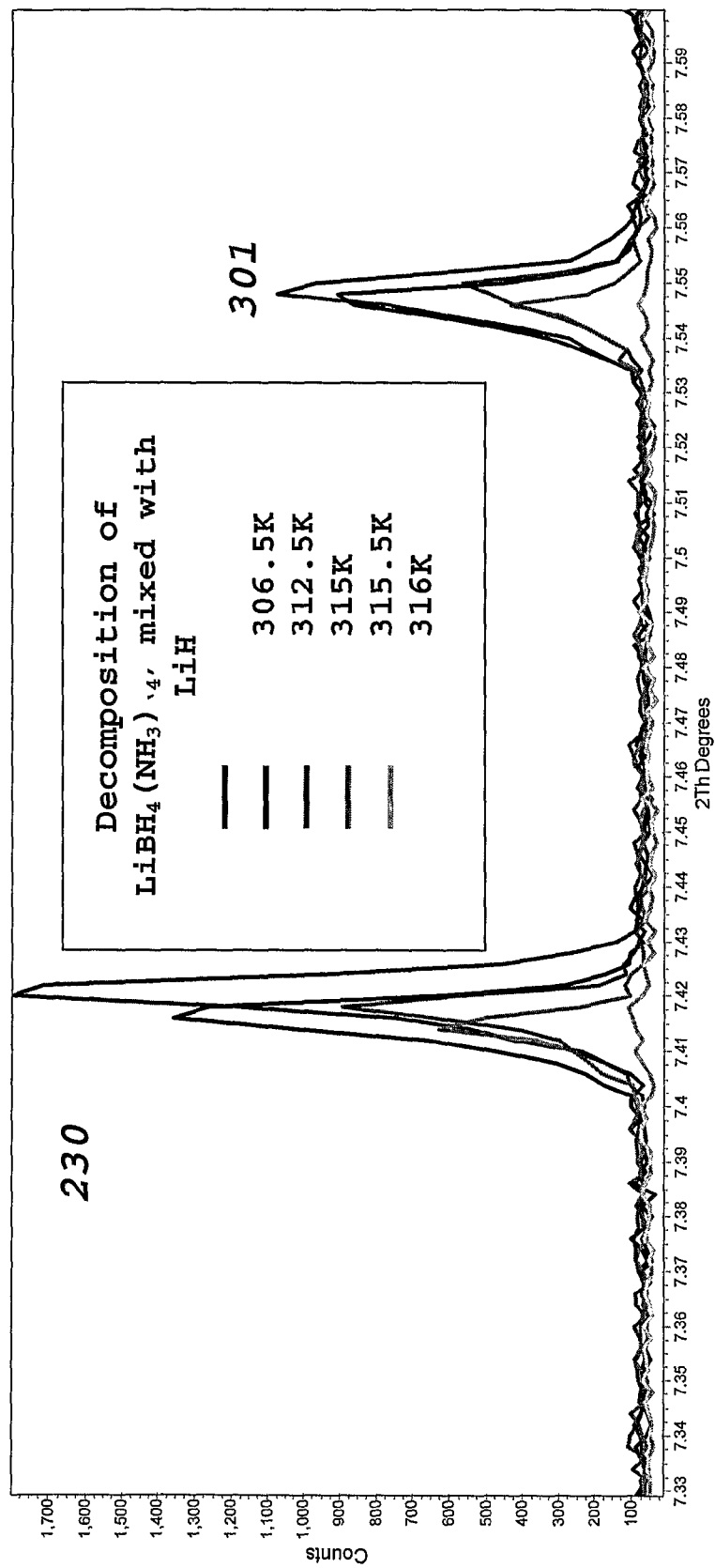

FIG. 7: Temperature resolved synchrotron X-ray diffraction data for the 400 diffraction peak of $LiBH_4(NH_3)_n$ phase of the nominal composition $LiBH_4(NH_3)_2$ FIG. 8: Temperature resolved synchrotron X-ray diffraction data for the 230 and 301 diffraction peaks of $LiBH_4(NH_3)_n$ phase of the nominal composition $LiBH_4(NH_3)_4$ when mixed with LiH.

Figure 9:
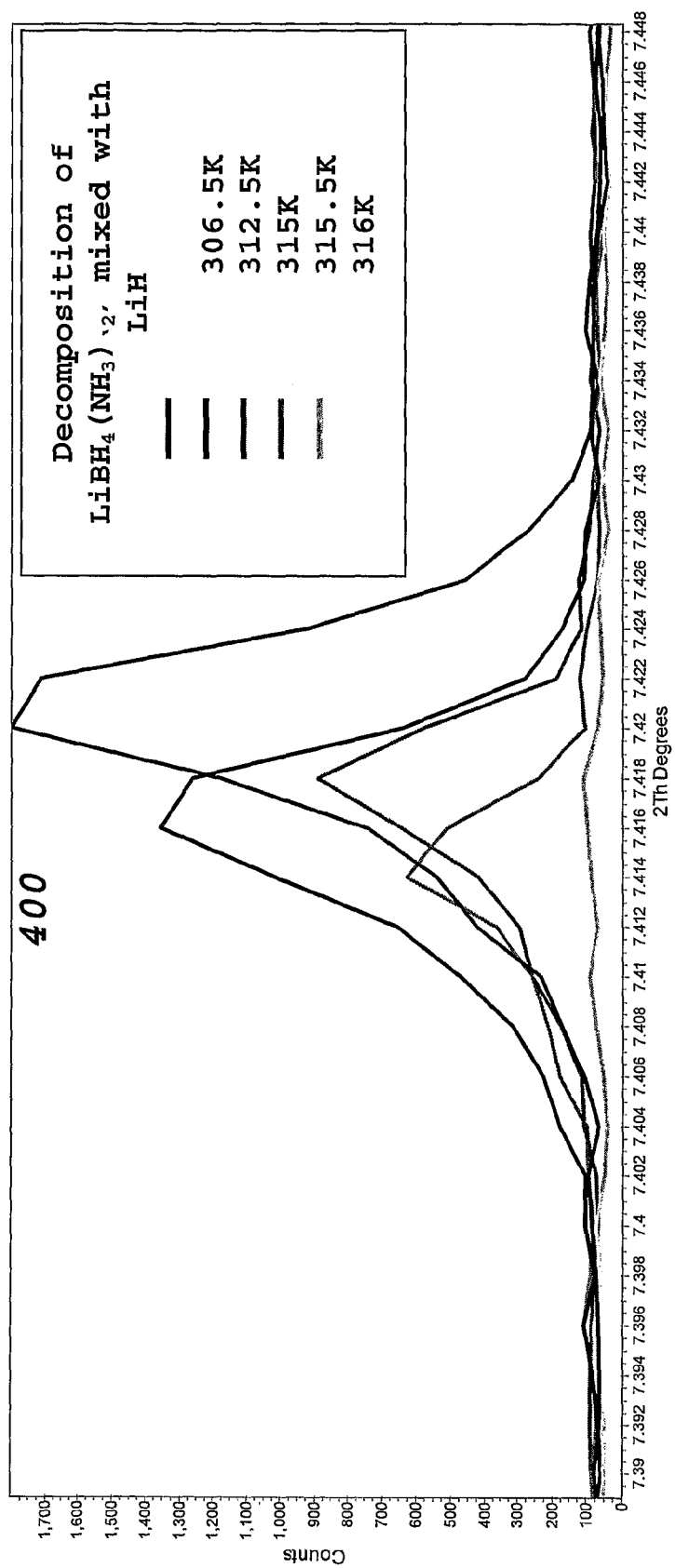

FIG. 9: Temperature resolved synchrotron X-ray diffraction data for the 400 diffraction peak of $LiBH_4(NH_3)_n$ phase of the nominal composition $LiBH_4(NH_3)_2$ a when mixed with LiH.

EXAMPLES

Preparation of $LiBH_4(NH_3)_n$ as Used in the Following Examples $LiBH_4(NH_3)_n$ may be synthesised via a number of routes. For example, excess gaseous ammonia may be flowed over dry $LiBH_4$ in an inert (argon gas) environment at room temperature (see Equation 1).

Equation 1

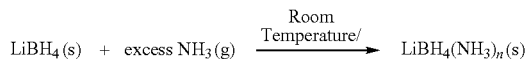

In particular, $LiBH_4$ (Sigma-Aldrich) may be placed in a schlenk tube, attached to a vaccum line and evacuated to $10^{-3}$ mbar. Ammonia gas (Sigma-Aldrich) is then flown over the $LiBH_4$ for 12 hrs, the excess ammonia removed by dynamic vacuum, and the system then flushed with argon gas.

Alternatively, dry $LiBH_4$ may be treated with dried liquid ammonia at −68° C. in an inert (argon gas) environment (See Equation 2).

Equation 2

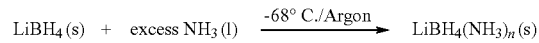

For example, $LiBH_4$ may be placed in a schlenk tube, attached to a vaccum line, evacuated to $10^{-3}$ mbar and then cooled to −68° C. in a dry ice/isopropanol bath. Ammonia (Sigma-Aldrich) gas is then condensed onto the $LiBH_4$ sample and allowed to react for two hours. The excess ammonia is then removed by dynamic vacuum, and the system then flushed with argon gas. All handling of materials before and after the reactions was carried out in a purified argon glovebox with an oxygen content of less than 0.1 ppm.

Characterization of $LiBH_4(NH_3)_n$ $LiBH_4(NH_3)_n$ may be characterised in a number of ways, for example, by neutron diffraction, synchrotron X-ray diffraction, Fourier Transform Infra-Red (FTIR) Spectroscopy and Magic Angle Spinning (MAS) Nuclear Magnetic Resonance (NMR) spectroscopy.

For neutron diffraction data, the samples were prepared from $ND_3$ and $^{11}B$ enriched $LiBD_4$ instead of $NH_3$ and $LiBH_4$. These samples were loaded and sealed in vanadium cans in an inert, argon atmosphere glove box and data collected, on the GEM diffractometer at the Rutherford Appleton Laboratory.

For X-ray diffraction data, samples were loaded and sealed into borosilicate glass capillaries in a nitrogen atmosphere glove bag, and data collected on the ID31 diffractometer at the ESRF, Grenoble.

Synchrotron X-ray Studies I

Synthesis

The X-ray diffraction data from a sample (S1) of the condensed phase obtained from reaction (1) is represented in FIG. 1, where a new phase (phase A), nominally $LiBH_4(NH_3)_4$, is identified along with a small amount of unreacted $LiBH_4$. Crystallographic analysis and indexing of phase A was performed using the TOPAS programme, and has shown it to be an orthorhombic phase in the Pmmm space group with lattice parameters of a=9.62 Å, b=13.7504 Å and c=4.442 Å.

The X-ray diffraction data from a sample (S2) of the condensed phase obtained from reaction (2) is represented in FIG. 2 and shows the presence of two phases, one identical to that identified above as phase A, and another of nominal composition $LiBH_4(NH_3)_2$ (phase B), together with a small amount of unreacted $LiBH_4$. Crystallographic Analysis and indexing of phase B was again performed using the TOPAS programme, and has shown it to be an orthorhombic phase in the Pmmm space group with lattice parameters of a=14.3424 Å, b=5.969 Å and c=4.464 Å.

FTIR

Fourier Transform Infra Red (FTIR) spectra were acquired from a Nicolet Magna FTIR equipped with a liquid nitrogen cooled MCTB detector from KBr disk;-samples of phase A and B at a resolution of 2 cm$^{-1}$. The FTIR spectrum of $LiBH_4$ before adsorption of ammonia demonstrated peaks at 1126 cm$^{-1}$, corresponding to a $BH_2$ deformation, and at 2225 cm$^{-1}$, 2238 cm$^{-1}$, 2291 cm$^{-1}$ and 2386 cm$^{-1}$, corresponding to B-Ht (terminal) stretching (FIG. 3a). The spectrum of the $LiBH_4$ after adsorption of ammonia (FIG. 3b) shows the $BH_2$ deformation to be now split into two peaks, occurring at 1122 cm$^{-1}$ and 1131 cm$^{-1}$, with three of the B-Ht stretches now occurring at 2218 cm$^{-1}$, 2311 cm$^{-1}$ and 2386 cm$^{-1}$ and the absorption at 2238 cm$^{-1}$ in LiBH$_4$ to be split into two peaks at 2233 cm$^-$and 2275 cm$^{-1}$, which we believe to be due to the coordinated ammonia species. New peaks at 1197 cm$^{-1}$ and in the 3600-3200 cm$^{-1}$ region are assigned, to N—H vibrations of adsorbed ammonia.

NMR

Solid state $^{11}$B NMR spectra were acquired on a 400 MHz Varian Inova spectrometer. Samples were packed into 3.2 mm o.d. rotors and spun at the magic angle at rates of 10 to 15 KHz. A pulse width of 0.4 to 1.4 µs was employed for data acquisition. The proton-decoupled solid state $^{11}$B NMR spectra of untreated LiBH$_4$ gave a single central transition at approximately −41.0 ppm, which, after adsorption of ammonia (FIG. 4), was found to be at −40.4 ppm implying that there is no bond formation between the boron and the ammonia.

Example 1

Synchrotron X-ray Diffraction Studies II
Temperature Resolved Ammonia Desorption The S2 sample was heated, from room temperature (295K) to 325K, with synchrotron X-ray diffraction data taken at every 2K, and this data is represented in FIG. 5. FIG. 6 shows an expansion of these data to highlight the 230 and 301 diffraction peaks of phase A (nominal composition LiBH$_4$(NH$_3$)$_4$). It can be clearly seen from these data that phase A has almost decomposed by 317K, and is complete decomposed by 319K. This is consistent with the loss of ammonia from phase A according to the following equation;

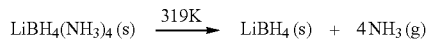

and thus corresponds to ammonia desorption temperature of 319K (46° C.).

FIG. 7 shows the 400 diffraction peak of phase B (nominal composition LiBH$_4$(NH$_3$)$_2$) as a function of temperature. It can be clearly seen that the decomposition of Phase B is considerably more gradual than that of Phase A. This is evident even if Phase A is converted to Phase B before decomposition, as would be expected for ammonia loss from materials of nominal composition LiBH$_4$(NH$_3$)$_4$ (A), forming LiBH$_4$(NH$_3$)$_2$ (B), since decomposition of phase B continues to proceed slowly even after the decomposition temperature of phase A (319K). Close inspection of FIG. 7 suggests that there is very little decomposition of phase B between 319K and 321K. This is consistent with the conversion of phase A into phase B at this temperature, with the newly formed phase B replacing that which decomposes, resulting in an overall appearance of little or no decomposition. The decrease of phase B as a function of temperature can be clearly identified in FIG. 7, with complete decomposition occurring at 327K (54° C.). This decomposition is consistent with the loss of ammonia from phase B according to the following equation;

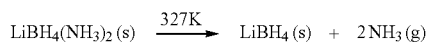

Continued heating of S2 beyond 327K caused rupture of the capillary.

The ammines of LiBH$_4$(LiBH$_4$(NH$_3$)$_n$ 0<n≦4) thus possess equivalent or greater gravimetric ammonia and hydrogen densities than their MgCl$_2$ counterparts and clearly show ammonia desorption at much lower temperatures.

Example 2

Synchrotron X-ray Diffraction Studies IV
Hydrogen Production at Low Temperature

Evidence for hydrogen production from LiBH$_4$(NH$_3$)$_4$ at approximately 50° C.

Phase A (LiBH$_4$ (NH$_3$)$_4$), produce by reaction of LiBH$_4$ and gaseous ammonia (1), was intimately mixed with lithium hydride and heated at 50° C., 100° C., 150° C. and 200° C. under an argon atmosphere. At each temperature, synchrotron X-ray diffraction studies show that the following reaction had occurred;

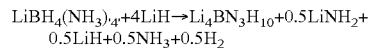

giving a gravimetric hydrogen density of 5.76 wt %.

The reaction as observed has not proceeded to completion, and may do so in a stoichiometric manner with differing products, depending on the amount of lithium hydride added;

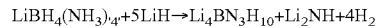

which has a theoretical maximum gravimetric hydrogen density of 6.2 wt %.

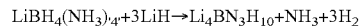

which has a theoretical maximum gravimetric hydrogen density of 5.3 wt %.

Analysis of the temperature resolved synchrotron X-ray diffraction data for the 230 and 301 peaks of nominal LiBH$_4$(NH$_3$)$_4$ (FIG. 8) and the 400 peak of nominal LiBH$_4$(NH$_3$)$_2$ (FIG. 9) shows a significant change in the temperature of decomposition in the presence of LiH. Both the LiBH$_4$(NH$_3$)$_4$ and LiBH$_4$(NH$_3$)$_2$ phases are now shown to decompose completely by 316K (43° C.) in the presence of LiH, as opposed to 319K (46° C.) for n=4 and 327K (54° C.) for n=2 in its absence.

The invention claimed is:

1. A method of producing hydrogen, the method comprising reacting a metal hydride with a metal borohydride ammoniate compound having the general formula:

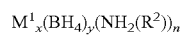

wherein M$^1$ comprises one or more of Li, Na, K, Rb, Cs, Be, Mg, Ca, Sr, Ba, La, Al, Ga or Sc;

0<n≦4;

R$^2$ comprises —H, alkyl or an aromatic substituent; and x and y are selected so as to maintain electroneutrality, wherein the compound is in a solid state form and acts as a solid state store for NH$_2$(R$^2$); and wherein the reaction results in hydrogen being produced.

2. The method of claim 1 wherein the metal hydride comprises one or more of LiH, NaH, KH, RbH, CsH, BeH$_2$, MgH$_2$, CaH$_2$, SrH$_2$, BaH$_2$, ScH$_3$, AlH$_3$, GaH$_3$, InH$_3$, SnH$_4$, SbH$_5$, PbH$_4$, or BiH$_3$.

3. The method of claim 2 wherein the metal hydride comprises LiH.

4. The method of claim 1 wherein the metal hydride comprises a hydride of one or more of a first row transition metal, a second row transition metal, and a third row transition metal.

5. The method of claim 4 wherein the first row transition metal is selected from the group consisting of Sc, Ti, V, Cr, Mn, Fe, Co, Ni, Cu and Zn.

6. The method of claim 1 wherein the second row transition metal is selected from the group consisting of Y, Zr, Nb, Mo, Tc, Ru, Rh, Pd, Ag and Cd.

7. The method of claim 1 wherein the third row transition metal is selected from the group consisting of La, Hf, Ta, W, Re, Os, Ir, Pt, Au and Hg.

8. The method of claim 1 wherein $R^2$ is hydrogen.

9. The method of claim 1 wherein $M^1$ is Li.

10. The method of claim 1 wherein the reaction is carried out in the temperature range of from 0 to 400° C.

11. The method of claim 1 wherein the reaction is carried out in the temperature range of from 275 to 350° C.

12. A method of producing $NH_2(R^2)$, the method comprising providing a metal borohydride ammoniate compound having the general formula:

$$M^1_x(BH_4)_y(NH_2(R^2))_n$$

wherein $M^1$ comprises one or more of Li, Na, K, Rb, Cs, Be, Mg, Ca, Sr, Ba, La, Al, Ga or Sc;

$0 < n \leqq 4$;

$R^2$ comprises —H, alkyl or an aromatic substituent; and x and y are selected so as to maintain electroneutrality;

wherein the compound is in a solid state form and acts as a solid state store for $NH_2(R^2)$, and heating said compound at a temperature of from 40 to 60° C. to produce $NH_2(R^2)$.

13. A method according to claim 1, or claim 12 which is carried out in a fuel cell.

14. The method of claim 12 wherein $R^2$ is hydrogen.

15. The method of claim 12 or 14 wherein $M^1$ is Li.

* * * * *